(12) United States Patent
Maethner

(10) Patent No.: US 7,996,149 B2
(45) Date of Patent: Aug. 9, 2011

(54) METHOD AND DEVICE FOR AUTOMATIC ROUTE REGISTRATION

(75) Inventor: Nils Maethner, Bonn (DE)

(73) Assignee: T-Mobile International AG & Co. KG, Bonn (DE)

( * ) Notice: Subject to any disclaimer, the term of this patent is extended or adjusted under 35 U.S.C. 154(b) by 928 days.

(21) Appl. No.: 11/910,767

(22) PCT Filed: Mar. 22, 2006

(86) PCT No.: PCT/DE2006/000526
§ 371 (c)(1),
(2), (4) Date: Oct. 5, 2007

(87) PCT Pub. No.: WO2006/105754
PCT Pub. Date: Oct. 12, 2006

(65) Prior Publication Data
US 2009/0043498 A1    Feb. 12, 2009

(30) Foreign Application Priority Data

Apr. 5, 2005   (DE) .................. 10 2005 015 693

(51) Int. Cl.
*G01C 21/00* (2006.01)

(52) U.S. Cl. ...................... 701/201; 701/209

(58) Field of Classification Search .......... 701/201, 701/209
See application file for complete search history.

(56) References Cited

U.S. PATENT DOCUMENTS

| 6,463,384 B1 | 10/2002 | Kaplan et al. | |
|---|---|---|---|
| 7,053,793 B2 * | 5/2006 | Tajima et al. | 340/928 |
| 2002/0067291 A1 * | 6/2002 | Ikeda | 340/928 |
| 2006/0200379 A1 * | 9/2006 | Biet | 705/13 |

FOREIGN PATENT DOCUMENTS

| DE | 202004004379 | 7/2004 |
|---|---|---|
| EP | 1517271 | 3/2005 |
| WO | 03063089 | 7/2003 |
| WO | 2004010386 | 1/2004 |

* cited by examiner

*Primary Examiner* — Mark Hellner
(74) *Attorney, Agent, or Firm* — Leydig, Voit & Mayer, Ltd.

(57) ABSTRACT

A method and a device for automatic route registration. A destination is entered into a data input device. A route is determined as a function of a starting location and the entered destination. The first route is transmitted to a route analysis device and divided into at least one route section therewith. The route section is registered in an evaluation device. Upon the detection of a first condition, a second route is determined to the destination. The second route is automatically transmitted to the route analysis device. The route analysis device compares the second route to the first route. Unused route sections of the first route are cancelled and added route sections of the second route are registered.

18 Claims, 3 Drawing Sheets

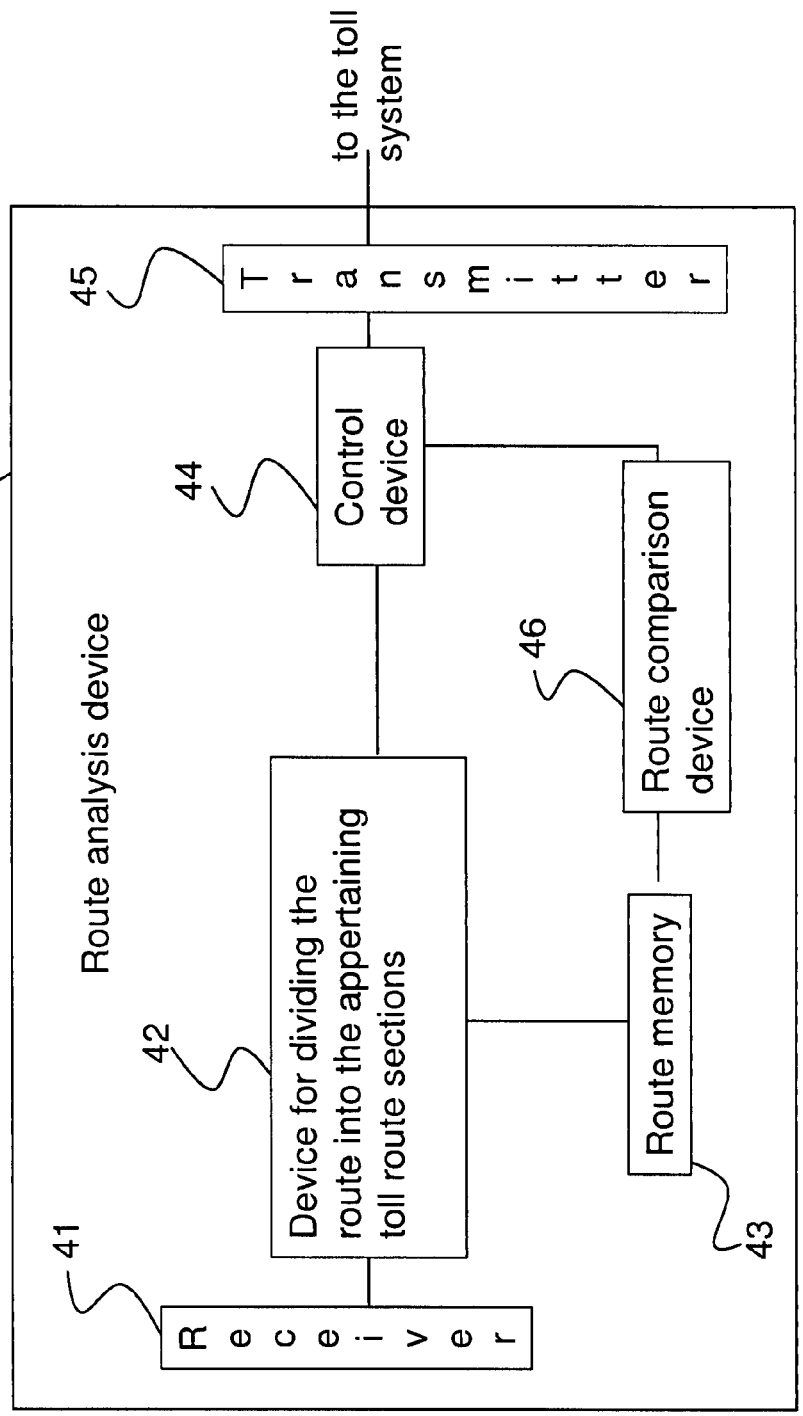

METHOD AND DEVICE FOR AUTOMATIC ROUTE REGISTRATION

CROSS REFERENCE TO PRIOR APPLICATION

This is a U.S. National Phase application under 35 U.S.C. §371 of International Application No. PCT/DE2006/000526, filed Mar. 22, 2006 and claims the benefit of German Patent Application No. 10 2005 015 693.2, filed Apr. 5, 2005. The International Application was published in German on Oct. 12, 2006 as WO 2006/105754 under PCT Article 21(2).

FIELD OF THE INVENTION

The invention relates to a method as well as to a device for automatic route registration, such as collecting tolls. The invention also relates to a route analysis device that is suitable for use in a device for automatic route registration.

BACKGROUND

In an effort to distribute road costs—including, for example, costs for the maintenance and expansion of highway systems—more equitably among the road users, systems for collecting road use fees, also called tolls, are employed. Here, a distinction is made between two modalities, namely, systems for charging a flat fee and systems for charging toll based on the route traveled.

One toll collecting system is based on short-range communication using so-called beacon systems. Such beacon systems are characterized in that a microwave transmitter is installed in a vehicle. Corresponding microwave antennas are set up along the toll route sections, and these antennas detect the passing vehicles that are quipped with a microwave transmitter and report them to a billing center so that the incurred tolls can be calculated.

Another toll collecting system is based on complex on-board systems. On-board systems contain so-called on-board units (OBU) that are installed in vehicles. The on-board units evaluate current position information that is picked up, for instance, by means of a GPS navigation system. On the basis of stored map data, the on-board unit calculates the distance traveled and uses this information to determine the driven sections of the toll road and to transmit this data to a billing center. A drawback of such on-board systems is that the on-board units installed in vehicles are technically complex and thus expensive devices. Moreover, the map data stored in on-board units has to be continuously updated when the road geometries change.

In yet another toll collecting system, before the trip begins, the planned driving route has to be manually registered via the Internet or by means of stationary terminals. For this purpose, as a rule, data about the start of the trip, truck-related data, starting time and destination all have to be entered manually by the transportation company via the Internet or by the drivers themselves at stationary terminals. On the basis of the entered data, the route is determined and the toll incurred is calculated. If the planned route is entered at a stationary terminal, the driver has to pay the toll immediately either in cash or else by some other payment modality.

Toll collecting systems that require the route to be entered manually have the disadvantage that, as soon as the driver leaves the registered route, either the new route has to be registered via the Internet or the driver has to stop, for example, at a service station that has a stationary terminal where the new route can be registered and paid for.

SUMMARY

It is an aspect of the present invention to provide a novel method and a novel device for automatic route registration as well as a route analysis device, which avoid the drawbacks of the above-mentioned toll collecting systems.

The present intention provides a method and a device for automatic route registration. A destination is entered into a data input device. A route is determined as a function of a starting location and the entered destination. The first route is transmitted to a route analysis device and divided into at least one route section therewith. The route section is registered in an evaluation device. Upon the detection of a first condition, a second route is determined to the destination. The second route is automatically transmitted to the route analysis device. The route analysis device compares the second route to the first route. Unused route sections of the first route are cancelled and added route sections of the second route are registered.

BRIEF DESCRIPTION OF THE DRAWINGS

The invention will be explained in greater detail below on the basis of two embodiments in conjunction with the accompanying drawings, which show the following.

DETAILED DESCRIPTION

Figure 1:
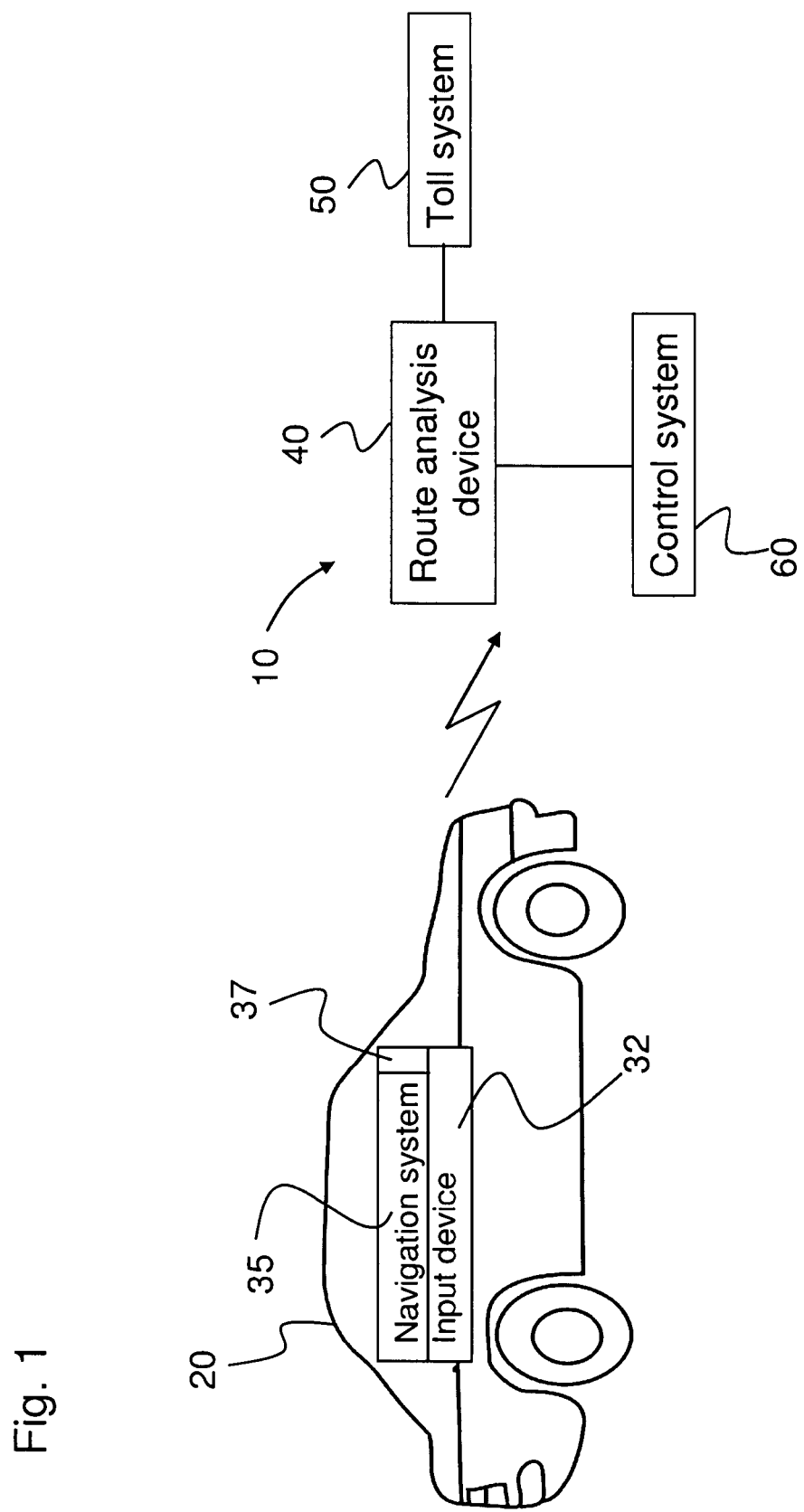
FIG. 1 an automatic route registration system according to the invention, which is used in a toll system, FIG. 2 an alternative automatic route registration system in which a navigation server is used, and FIG. 3 a block diagram of the route analysis device according to the invention shown in FIGS. 1 and 2.

The method according to the invention and the device according to the invention for automatic route registration may be used in an off-board toll collecting system. However, other areas of application such as, for instance, systems for automatically generating a driver's daily log are conceivable. Further, the term "route" or "driving route" as used herein, includes, for example, waterways in addition to regular roads.

An idea of the invention lies in providing road users with inexpensive on-board units and in facilitating the registration especially of toll routes, in that a planned travel itinerary, also referred to as a route, can be automatically registered in a central device without clients having to do anything themselves. An automatic registration of routes is also carried out especially if a new route has to be determined after the vehicle has left the currently planned route.

In an embodiment, the present invention provides a method for automatic route registration which is especially suitable for collecting tolls. Before the beginning of the trip, the driver of a vehicle, for example, enters a destination at a data input device. The data input device can but does not have to be installed in the vehicle. Depending on the starting location and on the entered destination, a current, planned route is determined by a navigation device. The starting location can be the current location of a vehicle, which can be automatically determined by the navigation device. Such a navigation device can be a GPS-compatible device (Global Positioning System).

The current route determined by the navigation device is transmitted to a route analysis device that divides the current route, preferably as a function of a predefined property, into at least one route section. If the predefined property relates to a toll charge, then the route analysis device divides the route into the appertaining toll route sections.

Each route section is automatically registered in an evaluation device. Registered route sections can be evaluated on the basis of a predefined parameter, which can be a toll. The evaluation device can be an integral part of a toll system that calculates the toll incurred for a driven route and that invoices the client accordingly.

Under certain conditions, a new route to the destination can be determined. In this case, the newly determined route is automatically transmitted to the route analysis device without clients having to do anything themselves.

The route analysis device compares the current route to the newly determined route. Moreover, the route analysis device ensures that the unused route sections of the current route, that is to say the sections that were not traveled, are canceled and that the newly added route sections of the newly determined route are automatically registered.

Accordingly, drivers only have to pay toll for route sections that they have actually driven on their way to their destination. An advantage for the drivers or for the transportation companies is that they do not have to pay attention to the actually used route, even if the route is changed, since the registration, cancellation and evaluation of the route sections are all done automatically.

In determining a suitable route to the destination, additional parameters, especially the time of day, traffic conditions, route distances, fuel costs and the like can all be taken into consideration.

In order to always be able to offer the driver an optimal route, the current route may be checked at predefined points in time and, if applicable, a new route to the destination can be determined.

A new route to the entered destination can also be determined if a road user leaves the current route.

As already mentioned, the destination and, if applicable, other preferred positions can be entered manually at an input device or else via an automatic interface. The automatic interface ensures that the destination is automatically transmitted to the navigation device and, if applicable, to a navigation server.

So that, for example, a transportation company can check the toll invoice that it has been invoiced, the route sections determined in the route analysis device are transmitted to a customer-specific control device. The control device is configured in such a way that it can calculate the amount of the toll on the basis of the actually driven route sections.

The above-mentioned technical objective is likewise achieved by a device for automatic route registration.

Accordingly, a device for entering at least one destination is provided. A first navigation device serves to determine a route as a function of a starting location and of the entered destination.

Here, it should be mentioned that the input device can also be implemented separately from the navigation device in the form of an automatic interface, for example, in the office of a transportation company. In this case, a second navigation device can be installed in a vehicle and can be configured for transmitting position data, while the first navigation device is associated with the route analysis device and is configured to determine a route on the basis of position data received from the second navigation device. In an embodiment, the input device is configured with a hard-wired or wireless interface for automatically transmitting the destination to the first navigation device.

As an alternative, the input device and the first navigation device can be configured as a unit and can be installed in a vehicle.

The first navigation device includes a device for automatically transmitting a determined route to a route analysis device that divides the determined route into at least one route section as a function of a predefinable property and that automatically registers this in an evaluation device. The evaluation device is configured to evaluate each route section with reference to a predefined parameter.

Under certain conditions, the first navigation device can determine a new route to the destination.

Moreover, the route analysis device comprises a device for comparing a current route to a newly determined route as well as a control device that ensures that unused route sections of the current route are cancelled and that added route sections of the newly determined route are registered in the evaluation device.

In an embodiment, the route analysis device and the evaluation device are at separate locations. Here, the route analysis device and the evaluation device can communicate with each other via hard-wired or wireless interfaces.

In another embodiment, the evaluation device is an integral part of a toll system.

As an alternative, the route analysis device and the evaluation device can also be implemented at the same location.

The route analysis device can include a storage unit in which the current route as well as a newly determined route can be stored.

The above-mentioned technical objective is likewise achieved by a route analysis device.

The route analysis device has a device for receiving data that represents a route. A dividing device serves to divide the route into at least one route section and it does so as a function of a predefined property. A comparison device serves to compare the route section of a current route to a newly determined route. Moreover, a control device is provided that, in response to the result of the comparison device, registers route sections of a current route, cancels unused route sections of the current route and/or registers added route sections of a newly determined route.

FIG. 1 shows an automatic route registration system generally designated with the reference numeral 10, comprising, for example, a vehicle 20, a route analysis device 40, a toll system 50 and a control system 60. The route registration system 10 is used, for example, for off-board toll collection. In this case, off-board means that the toll for a toll road is calculated outside of the vehicle 20. The route analysis device 40 can communicate via a hard-wired or wireless interface with the toll system 50 and with the control system 60. In FIG. 3, the interface is designated as the transmitter 45. At this juncture, it should already be pointed out that the interface can also be a transmitter/receiver device.

As shown in FIG. 1, an input device 32 as well as a navigation device 35 are installed in the vehicle 20. The navigation device 35 and the input device 32 can form a unit. The navigation device 35 is associated with a wireless interface 37 via which the navigation device 35 can communicate directly with the route analysis device 40.

Figure 2:
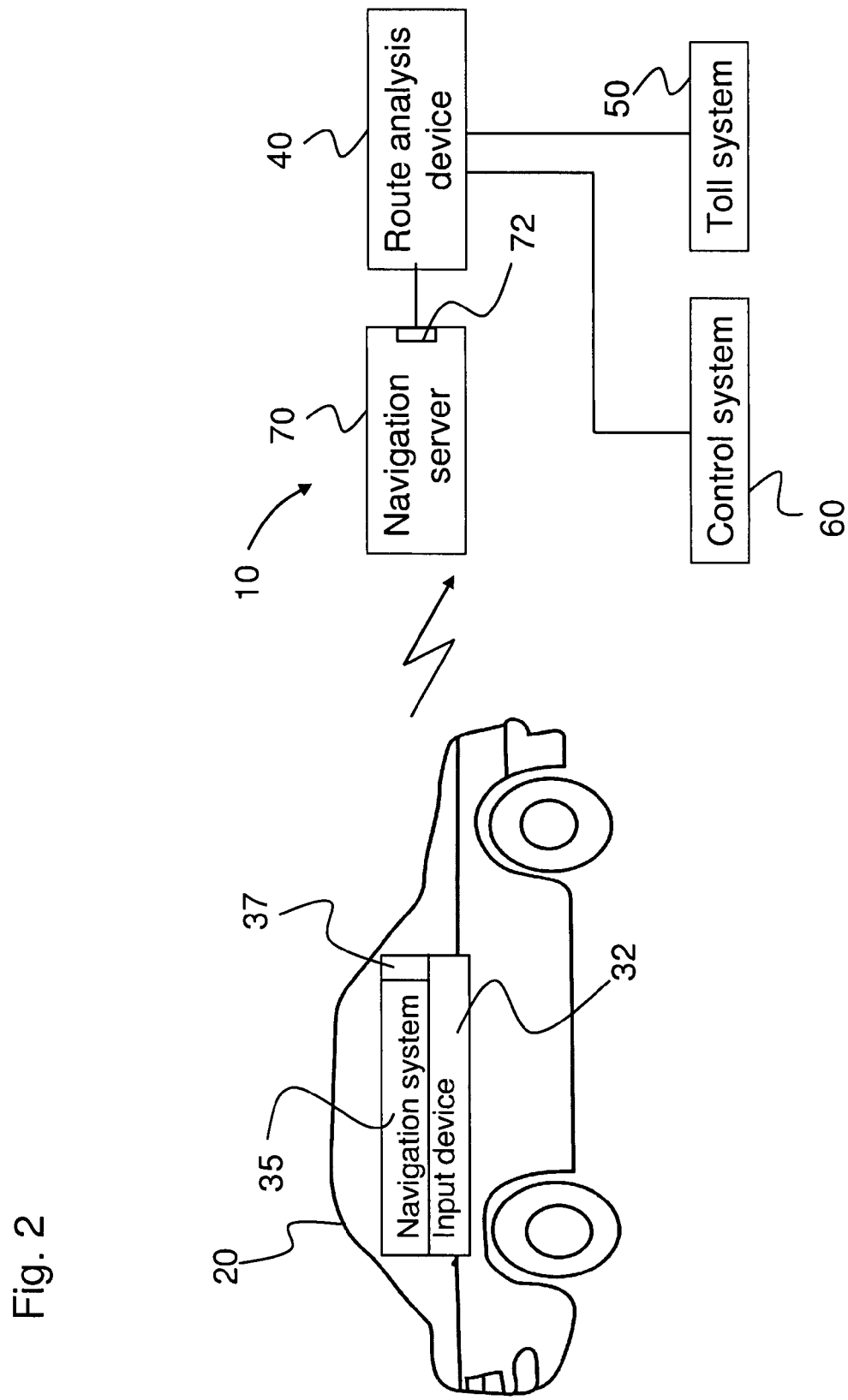

FIG. 2 likewise shows an automatic route registration system that differs from the system shown in FIG. 1 in that a navigation server 70 is connected to the route analysis device 40 via an interface 72. In this case, the navigation server 70 determines a route on the basis of a predefined starting location and of a destination and it transmits this route to the route analysis device 40. The starting location and the destination can be entered at the input device 32 or at a terminal set up outside of the vehicle 20 and can then be transmitted to the navigation server 70. In this embodiment, the navigation device 35 serves to transmit position data of the current route to the navigation server 70 at regular intervals or else when the vehicle leaves the planned route. On the basis of the transmitted position data, the navigation server 70 can detect when the vehicle 20 leaves the current route. Once the vehicle has left the current route, the navigation server 70 determines a new route and transmits the data of the new route to the route analysis device 40.

The position data generated by the navigation device 35 can also be used by the route analysis device 40 in order to determine used and unused route sections of a route currently registered in a toll system 50.

As will be explained in greater detail below, the route analysis device 40 is capable of ensuring that unused route sections of the currently registered route are automatically cancelled in the toll system 50 and that route sections of a newly determined route are registered. A control system 60 can, in turn, be connected to the route analysis device 40.

FIG. 3 shows a route analysis device 40 according to the invention in greater detail. On the input side, the route analysis device 40 has a receiver 41 that receives the position data that represents a route and that is transmitted from the navigation device 35 or from the navigation server 70. The receiver 41 forwards the position data that characterizes a route to a device 42 that divides the route into the appertaining toll route sections. For this purpose, the dividing device 42 may uses a database which stores all of the toll route sections on a digitally stored map. On the basis of the received position data that represents the current route, the dividing device 42 is capable of determining the toll route sections that belong to the route. The toll route sections are stored in a route memory 43. As will be explained below in greater depth, the route memory also contains the toll route sections of other routes. A route comparison device 46 is connected to the route memory 43 in order to compare a current route to a newly determined route. The route comparison device 46 is connected to a control device 44 that, in response to the output signal of the route comparison device 46, transmits control data to the toll system 50 via the transmitter 45. The control data causes an evaluation device that is implemented in the toll system 50 to cancel, for example, unused toll route sections of the current route and to automatically register added toll route sections of a newly determined route in the toll system. The control device 44 can be connected directly to the dividing device 42 in order to first cause the transmitter 45 to automatically transmit the toll route sections belonging to the current route to the toll system 50 and then to cause the toll system 50 to register the toll route sections.

Below, the mode of operation of the automatic route registration system shown in FIG. 1 is explained in greater detail in conjunction with FIG. 3.

Assuming that the driver of the vehicle 20 enters the destination of his planned route at the input device 32. The navigation device 35 then determines the planned route on the basis of the current location and the entered destination. The position data relating to the planned route is transmitted to the route analysis device 40 via the wireless interface 37. The planned route, that is to say, the current route that is to be registered, is transmitted from the receiver 41 to the dividing device 42 that divides the planned route into the appertaining toll route sections. The data representing the toll route sections is stored in the route memory 43. In addition, the determined toll route sections are forwarded to the control device 44 which ensures that the toll route sections are transmitted via the transmitter 45 to the toll system 50 and registered there.

The toll system 50 or the route analysis device 40 may generate a confirmation message that is sent to the vehicle 20 or to the shipping company in order to confirm the currently registered toll route sections.

Moreover, assuming that the driver of the vehicle 20 has left the route registered in the toll system 50, in response to this, the navigation device 35 determines a new route to the initially entered destination. The position data of the newly determined route is, in turn, transmitted to the route analysis device 40. The dividing device 42 divides the newly determined route into the appertaining toll route sections which are, in turn, stored in the route memory 43. It should be noted that the navigation device 35 can determine not only complete routes and transmit the corresponding data to the route analysis device 40, but that it can also continuously transmit position data of the currently used route to the route analysis device 40. In response to this position data, the route comparison device 46 is able to recognize the route sections that have not yet been used as well as the new route since it compares the data for the currently registered route stored in the route memory 43 to the newly determined route. The route comparison device 46 transmits the result to the control device 44 which ensures that the toll system 50 cancels the unused route sections of the currently registered route and that it registers the added route sections of the newly determined route.

In turn, the route analysis device 40 or the toll system 50 can generate a confirmation message that indicates to the driver or to the shipping company which route sections were canceled and which route sections were newly registered.

Instead of transmitting the position data from the navigation device 35 directly to the route analysis device 40, as is shown in FIG. 1, it is conceivable for the position data generated by the navigation device 35 to be transmitted via the interface 37 to the navigation server 70, which then ensures that the data is transmitted to the route analysis device 40, according to the embodiment shown in FIG. 2. As already described above, the navigation server 70 also serves to determine the route to be registered in the toll system 50 as well as the new routes, and it also serves to transmit the applicable route data to the route analysis device 40.

The route analysis device 40 can be configured in such a way that the route sections that have been registered, canceled and/or subsequently registered in the toll system are transmitted to the control system 60. The control system 60 belongs, for example, to the shipping company and is configured in such a way that it can calculate the toll to be paid for a used route so that the toll invoice generated in the toll system 50 can be checked.

For this purpose, the control system 60 can know all of the toll route sections and to know the amount of the toll for each toll route section.

The invention claimed is:

1. A method for automatic route registration comprising:
   entering a destination at a data input device;
   determining a route as a function of a starting location and the entered destination;
   transmitting the first route to a route analysis device;
   dividing the first route into at least one route section using the route analysis device;
   registering the at least one route section in an evaluation device; and
   upon detection of a predefined condition:
   determining a second route to the destination;
   automatically transmitting the second route to route analysis device;

comparing the second route to the first route using the route analysis device;
canceling unused route sections of the first route; and
registering added route sections of the second route.

2. The method as recited in claim 1 wherein the determining the first route is performed as a function of at least one of a time of day, traffic conditions, route distance and toll costs.

3. The method as recited in claim 2 further comprising checking the first route at predefined points in time and wherein the determining the second route is performed as a function of the checking the route.

4. The method as recited in claim 1 wherein the predefined condition includes a road user leaving the first route.

5. The method as recited in claim 1 wherein the entering a destination is performed manually.

6. The method as recited in claim 1 wherein the entering a destination is performed using an automatic interface.

7. The method as recited in claim 1 further comprising evaluating the registered route sections based on a predefined parameter.

8. The method as recited in claim 7 wherein the predefined parameter is a toll.

9. The method as recited in claim 1 further comprising checking the at least one route section using a customer-specific control device.

10. The method as recited in claim 1 wherein the determining the first route is performed using a navigation device.

11. The method as recited in claim 10 wherein the navigation device is disposed in a vehicle.

12. The method as recited in claim 10 wherein the navigation device is disposed in a navigation server.

13. An automatic route registration apparatus comprising:
an input device for entering a destination;
a first navigation device configured to determine a first route as a function of a starting location and the entered destination and to determine a second route to the entered destination;
a route analysis device configured to divide the first route into at least one route section and to register the at least one route section in an evaluation device, the route analysis device including a comparing device configured to compare the first route to the second route, the route analysis device including a control device configured to cause unused sections of the first route to be cancelled and added route sections of the second route to be registered; and
a transmitting device associated with the first navigation device and configured to automatically transmit the determined first route to the route analysis device.

14. The apparatus as recited in claim 13 wherein the input device and the first navigation device are disposed in a unit configured for disposing in a vehicle.

15. The apparatus as recited in claim 13 further comprising a second navigation device disposed in a vehicle and configured to transmit position data, and
wherein the input device is disposed at a central location separate from the navigation device, and
wherein the first navigation device is associated with the route analysis device and is configured to determine a route in response to position data received from the second navigation device.

16. The apparatus as recited in claim 13 wherein the route analysis device and the evaluation device are disposed at separate locations.

17. The apparatus as recited in claim 13 wherein the evaluation device is configured to evaluate the at least one registered route section based on a predefined parameter.

18. The apparatus as recited in claim 13 wherein the route analysis device further comprises a receiving device operable to receive data representing the first route.

* * * * *